United States Patent
Brady et al.

(10) Patent No.: US 12,373,709 B1
(45) Date of Patent: Jul. 29, 2025

(54) DYNAMICALLY UPDATABLE RULES ENGINE, AND CORRESPONDING SYSTEMS AND METHODS OF USE

(71) Applicant: Phizzle, Inc., San Francisco, CA (US)

(72) Inventors: Ryan Brady, Aurora, CO (US); Michael Patrick, Melville, NY (US); Benjamin Davis, III, San Francisco, CA (US); Edwin J. Lau, San Jose, CA (US); James L. Whims, Saratoga, CA (US); Stephen Peary, Scottsdale, AZ (US)

(73) Assignee: Phizzle, Inc., San Francisco, CA (US)

( * ) Notice: Subject to any disclaimer, the term of this patent is extended or adjusted under 35 U.S.C. 154(b) by 11 days.

(21) Appl. No.: 18/095,421

(22) Filed: Jan. 10, 2023

Related U.S. Application Data

(63) Continuation of application No. 16/355,793, filed on Mar. 17, 2019, now Pat. No. 11,580,418.

(51) Int. Cl.
*G06N 5/04* (2023.01)
*G06N 5/025* (2023.01)
*G06N 5/022* (2023.01)

(52) U.S. Cl.
CPC .............. *G06N 5/025* (2013.01); *G06N 5/04* (2013.01); *G06N 5/022* (2013.01)

(58) Field of Classification Search
None
See application file for complete search history.

(56) References Cited

PUBLICATIONS

Luke, Essentials of Metaheuristics, Lulu, second edition, Feb. 2016, pp. 1-263 (Year: 2016).*

* cited by examiner

*Primary Examiner* — Wilbert L Starks

(57) ABSTRACT

A system for automatic and dynamic control of machine operations includes a connection to a machine external to the system; sensors configured and deployed to monitor an operation of the external machine and to generate sensor records; a sensor data processing apparatus configured and deployed to receive sensor records from the sensors, and to identify, based on the received sensor records, events and corresponding event conditions affecting an operation of the machine. The processing apparatus is further configured to identify a rule set that, when applied to the machine, alters the operation of the machine by the processing apparatus selectively prioritizing application of the rules to the machine by using only those rules that are operationally relevant to identified events and corresponding event conditions affecting the operation of the machine.

18 Claims, 12 Drawing Sheets

DYNAMICALLY UPDATABLE RULES ENGINE, AND CORRESPONDING SYSTEMS AND METHODS OF USE

RELATED APPLICATIONS

This application is a continuation of U.S. patent application Ser. No. 16/355,793, filed Mar. 17, 2019, entitled Dynamically Updatable Rules Engine, the disclosure of which is hereby incorporated by reference.

TECHNICAL FIELD

This disclosure relates, in general, to a hardware apparatus (and corresponding systems and networks) for processing Internet of Things (IoT) sensor data optionally through the use of a programmable intelligent machine. More particularly, the disclosure relates to an apparatus in which users and/or an inference engine specify rules for handling sensor data in such a way that a dynamically updateable rules engine is able to handle a high transaction rate of sensor data in which there are complex rules to process such sensor data.

BACKGROUND

As the processing power of Internet of Things (IoT) devices has grown, so has the number of applications. An important and growing area of use for these devices is as sensor controllers. The sensors are instruments or virtual instruments (such as cell phones) which are able to detect events and conditions around the sensor. IoT devices (also referred to as Edge Computing Devices) may be used to control and manage sensors, capturing information sent by sensors and directing responses/actions, possibly in real-time, to the sensors or other external machines. By being able to intelligently monitor and react to detailed status (e.g., rotation speed of a lathe), operating conditions (e.g., temperature, humidity, precipitation, etc.,) and external events, (e.g., roadway accidents, etc.), IoT devices enable complex processes to be managed more effectively and efficiently in areas as diverse as manufacturing, inventory control, transportation, entertainment, etc.

In many cases, an abundance of data is captured in real time by the sensors. This may require substantial processing by an Edge Computing Device in order to effectively react to the current state of that which is being monitored. Under these circumstances, it is possible that the Edge Computing Devices, being burdened by the complexity of determining the state and appropriate response, may be limited in the rate at which sensor data may be processed.

Moreover, for deployment, environmental and safety reasons, the Edge Computing Devices may not be co-located with the actual sensors. In this case, the sensors deliver their data to the Edge Computing Device via a communication protocol and network. Furthermore, in-depth analysis of the data could offer insights (which could be more efficiently processed using computational resources apart from the Edge Computing Devices) that may be useful for more effective management of that which is being monitored. Those computational resources may reside in or near the Edge Computing Devices and/or externally available over a communication protocol and a public and/or private network.

SUMMARY

The disclosed examples realize the potential of the using sensors and edge computing devices to collect and process high volumes of information in complex environments through a dynamically updatable rules engine. The examples address the issue of transaction processing rate through an apparatus and method which effectively reduces the number of rules that are evaluated by a rules engine.

An example system for automatic and dynamic control of machine operations includes a connection to a machine external to the system; sensors configured and deployed to monitor an operation of the external machine and to generate sensor records; a sensor data processing apparatus configured and deployed to receive sensor records from the sensors, and to identify, based on the received sensor records, events and corresponding event conditions affecting an operation of the machine. The processing apparatus is further configured to identify a rule set that, when applied to the machine, alters the operation of the machine by the processing apparatus selectively prioritizing application of the rules to the machine by using only those rules that are operationally relevant to identified events and corresponding event conditions affecting the operation of the machine.

An example computer-implemented method for controlling an external machine includes establishing, from a data processing apparatus external to the external machine, a connection to the external machine; the data processing apparatus configuring one or more sensors deployed to monitor operations of the external machine to generate sensor records; the data processing apparatus configured to receive one or more sensor records from the one or more sensors, and to identify, based on the received one or more sensor records, one or more events and corresponding event conditions affecting an operation of the external machine; identifying, by the data processing apparatus, a rule set comprising a plurality of rules that when applied to the external machine, alter the operation of the external machine; and the data processing apparatus selectively prioritizing application of one or more rules from the rule set, comprising the data processing apparatus selecting for application to the external machine, only those rules that are operationally relevant to identified events and corresponding conditions affecting the operation of the external machine.

A non-transitory, computer-readable storage medium has encoded thereon, machine instructions executable by a processing apparatus for controlling operation of an external machine. The processing apparatus executes the machine instructions to establish a connection from a data processing apparatus to the external machine; configure one or more sensors deployed to monitor operations of the external machine to generate sensor records; receive one or more sensor records from the one or more sensors, and to identify, based on the received one or more sensor records, one or more events and corresponding event conditions affecting an operation of the external machine; identify a rule set comprising a plurality of rules that when applied to the external machine, alter the operation of the external machine; and selectively prioritize application of one or more rules from the rule set, wherein the data processing apparatus selects for application to the external machine, only those rules that are operationally relevant to identified events and corresponding conditions affecting the operation of the external machine.

An example apparatus includes a plurality of sensors; a dynamically updateable rules engine coupled to the plurality of sensors; a data collection management module coupled to the dynamically updateable rules engine and the plurality of sensors; and a data storage and analysis inference module coupled to the data collection management module, the dynamically updateable rules engine and the plurality of sensors, wherein data from the plurality of sensors that is received by the dynamically updateable rules engine is transformed by the dynamically updateable rules engine by selectively executing rules based on conditions or events and wherein the dynamically updateable rules engine is updated by the data storage and analysis inference module.

An example process includes operating a sensor system including receiving data from a plurality of sensors using a dynamically updateable rules engine that is coupled to the plurality of sensors; processing the received data using the dynamically updateable rules engine by selectively executing rules based on conditions or events; transmitting the processed data from the dynamically updateable rules engine to a data collection management component that is coupled to the dynamically updateable rules engine and the plurality of sensors; and updating dynamically the dynamically updateable rules engine using a data storage and analysis inference module that is coupled to the dynamically updateable rules engine, the dynamically updateable rules engine and the plurality of sensors.

BRIEF DESCRIPTION OF THE DRAWINGS

The drawings accompanying and forming part of this specification are included to depict certain examples. A clearer concept of the examples disclosed in this application will be readily apparent by referring to the exemplary, and therefore nonlimiting, examples illustrated in the drawings (wherein identical reference numerals (if they occur in more than one view) designate the same elements). The described examples may be understood by reference to one or more of these drawings in combination with the following description.

DETAILED DESCRIPTION

A system for automatic and dynamic control of machine operations includes a connection to a machine external to the system; sensors configured and deployed to monitor an operation of the external machine and to generate sensor records; a sensor data processing apparatus configured and deployed to receive sensor records from the sensors, and to identify, based on the received sensor records, events and corresponding event conditions affecting an operation of the machine. The processing apparatus is further configured to identify a rule set that, when applied to the machine, alters the operation of the machine by the processing apparatus selectively prioritizing application of the rules to the machine by using only those rules that are operationally relevant to identified events and corresponding event conditions affecting the operation of the machine.

Figure 1:
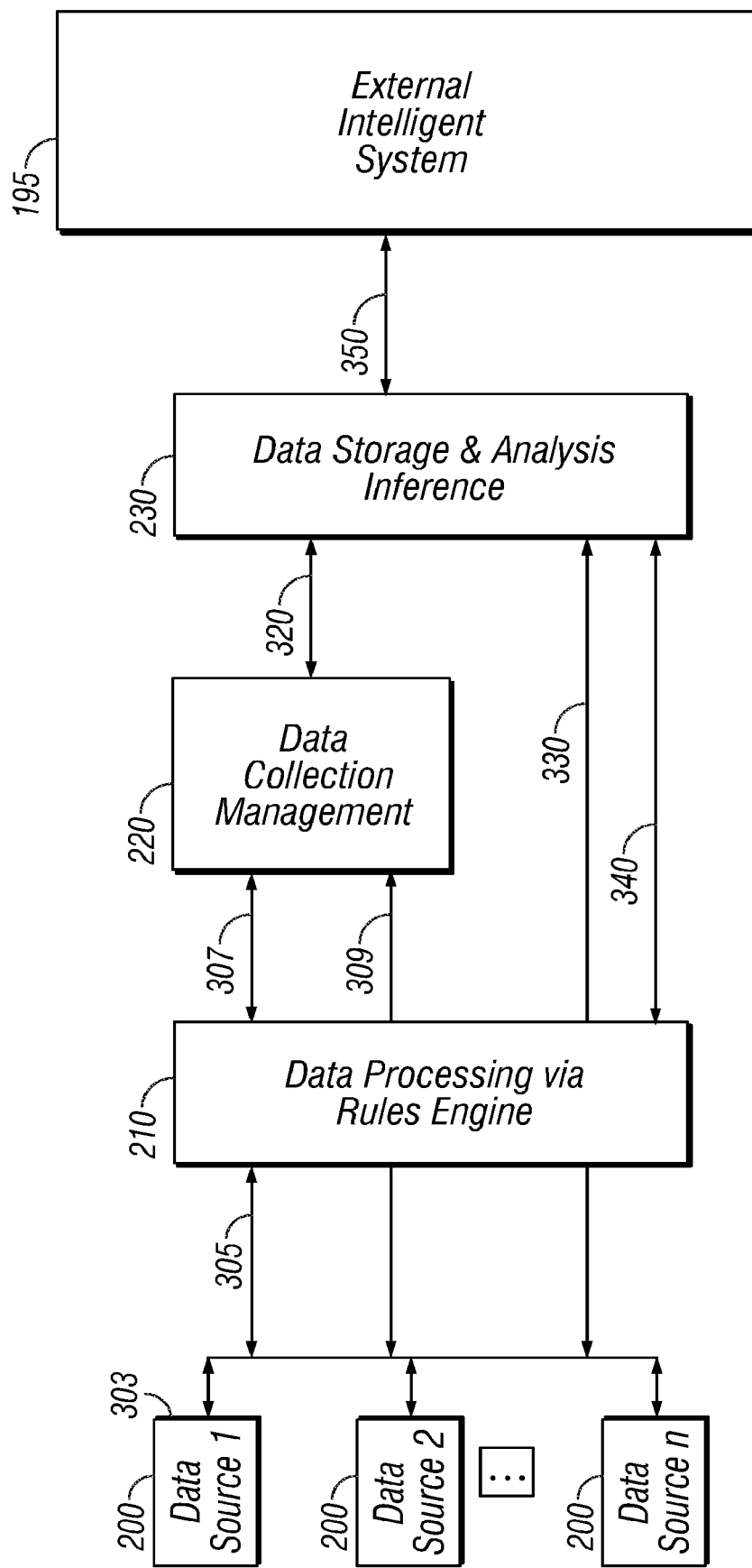
FIG. 1 is block schematic diagram of various elements associated with a herein disclosed rules engine and corresponding system, apparatus, and network.

FIG. 1 is a diagram of various elements associated with such an example system. Data sources 1-n corresponding to a plurality of dependent or independent sensors 200, dynamically updateable rules engine 210, data collection management module 220, a data storage and analysis inference component 230 and an external intelligent system 195 are all coupled together. These elements in different co-located connected combinations and/or separately located coupled combinations make up components of the various examples disclosed herein. The data sources 1 to n corresponding to a plurality of dependent or independent sensors 200 are coupled together via a bidirectional communication link and protocol 303.

A data source 1 to n, including one of the plurality of dependent or independent sensors 200, can communicate via a bidirectional communication link and protocol 303 and a bidirectional communication link and protocol 305 to dynamically updateable rules engine 210. The dynamically updateable rules engine can communicate via a bidirectional communication link and protocol 307 to data collection management module 220.

A sensor data processing apparatus in accordance with the herein disclosed rules engine can be divided into five components: the data sources 1 to n corresponding to a plurality of dependent or independent sensors 200, the dynamically updateable rules engine 210, the collection management module 220, the data storage and analysis inference component 230, and the external intelligent system 195 as illustrated in FIG. 1.

The sensor data processing apparatus is initialized and may be updated through a user interface where system administrators define the format of the data (including the fields and ranges within the data), the rules for processing the data, and actions associated with the rules. The updating can be periodical. The updating may be performed automatically as a result of changes in the frequency of occurrence or changes in the range of fields detected by the sensors and/or by the modification/addition of rules derived by the intelligent analysis of historical sensor data and rules.

Figure 2A:
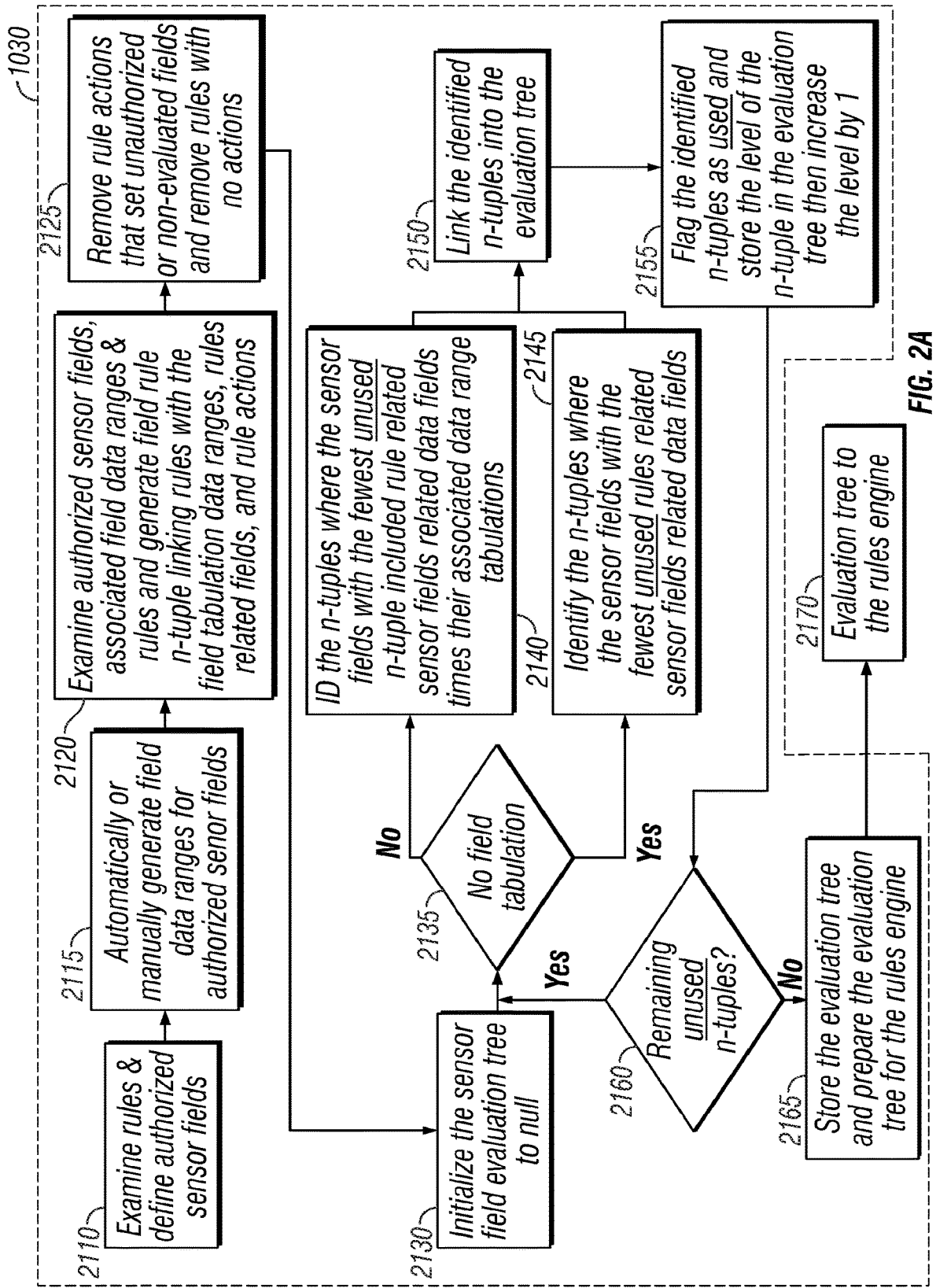
FIG. 2A is a flow diagram of a process that can be implemented by a computer program associated with the apparatus shown in FIGS. 4-9.

FIG. 2A illustrates a process 1030 whereby data collection management module 220 initializes and updates the rules for evaluation by dynamically updateable rules engine 210. This FIG. 2A is associated with data collection management module 220 of the apparatus shown in FIGS. 4-9 and represents a detailed independent description of the process 1030 within data collection management module 220.

Specifically, to initialize or update the sensor data processing apparatus, rules are examined and authorized fields within data returned by sensors are defined 2110. With each authorized field, data ranges are initially set manually or automatically 2115. Automatic ranges may be set if there is historical data associated with the field and the ranges or if there default range values specified for the field. For each authorized field, a field n-tuple is created linking the field with the rules and rules actions that are associated with the field as well as other fields which may also be evaluated with the aforementioned rules 2120. The other fields may define evaluation priorities, weights, or even define functions to be performed or utilized when encountering the specific authorized field. Rules that set or utilize unauthorized fields or have no associated actions are flagged as such or removed 2125. This is followed by steps 2130, 2135. The n-tuples are evaluated and organized 2140 and 2145, associating sensor field n-tuples with other sensor field n-tuples of the same complexity with one another 2150. The field n-tuple complexity for a sensor field is equal to the number of other field n-tuples included in rules related sensor fields not counting those sensor fields already evaluated and organized. The complexity value may also include the historical tabulation of the field data ranges (e.g., a historical histogram of the occurrence of the data ranges for a field). The n-tuples of fields with the same complexity are grouped together 2155. This is followed by step 2160. The groupings are ordered into a prioritized evaluation tree from the least complex to the most complex groupings 2165. The prioritized evaluation tree is utilized by a dynamically updateable rules engine 210, organized and optimized for a specific or a number of conditions including lowest peak utilization, speed, etc. with only rules that matter for a specific environment accounting for frequency of sensor field occurrence 2170. An implementation of this process is shown in FIG. 2A.

Figure 3:
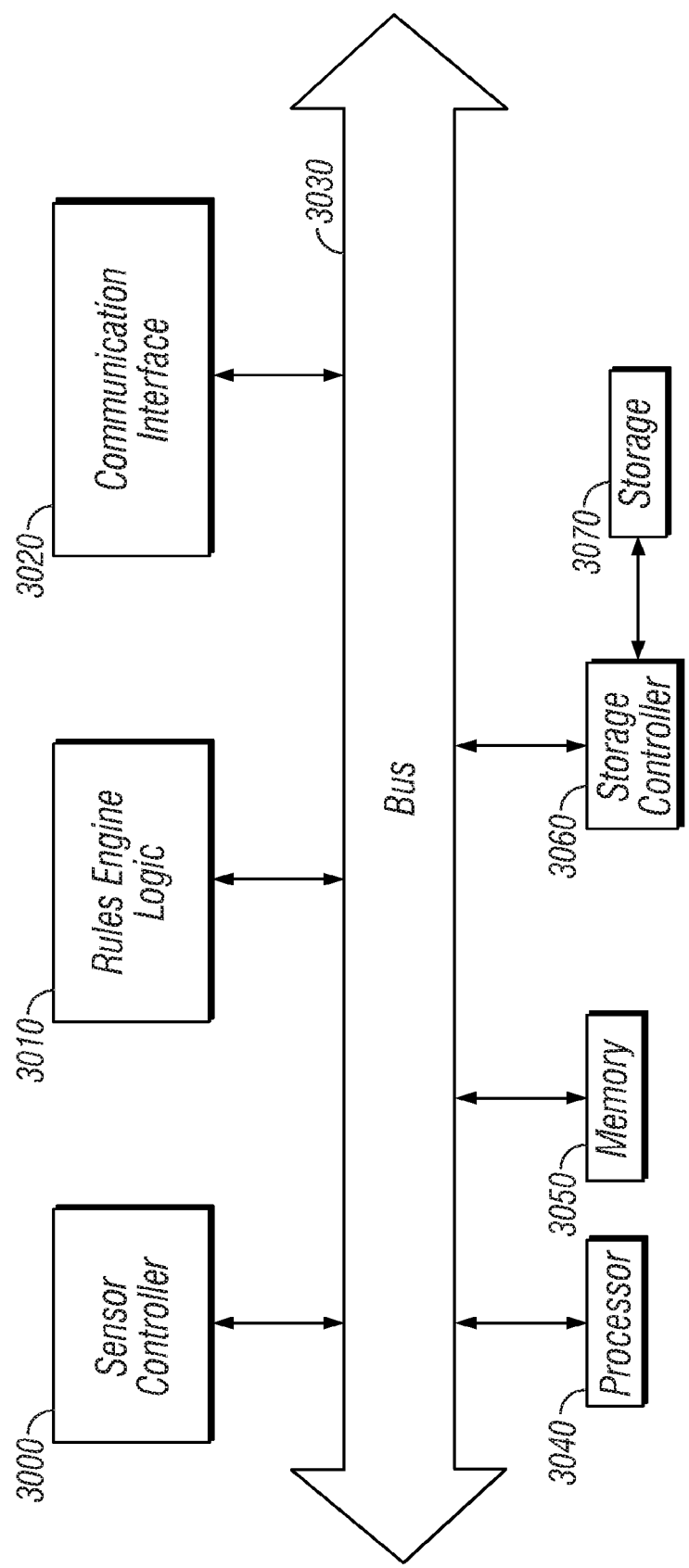
FIG. 3 is a block schematic diagram of the dynamically updateable rules engine hardware components associated with the data processing via rules engine shown in FIGS. 4-9.

Moreover, the prioritized evaluation tree may be processed such that which may be described in a programming language such as C and/or a hardware description language (HDL) such as Verilog or VHDL and loaded into rules engine logic 3010 in FIG. 3. The prioritized evaluation tree represented as a programming language may be delivered as such or as a compiled binary. The compiled binary representation would result in the prioritized evaluation tree being loaded into memory 3050 in FIG. 3. Memory 3050 could be volatile (e.g., DRAM) and/or non-volatile (e.g., PROM, EPROM, and EEPROM) memory. The HDL representations of the prioritized evaluation tree enable the use of field-programmable gate arrays (FPGAs) from vendors such as Altera and Xilinx within dynamically updateable rules engine 210 such that the rules processing is performed using FPGAs. The HDL representation would result in the prioritized evaluation tree being loaded into dynamically updateable rules engine logic 3010 in FIG. 3.

Figure 2B:
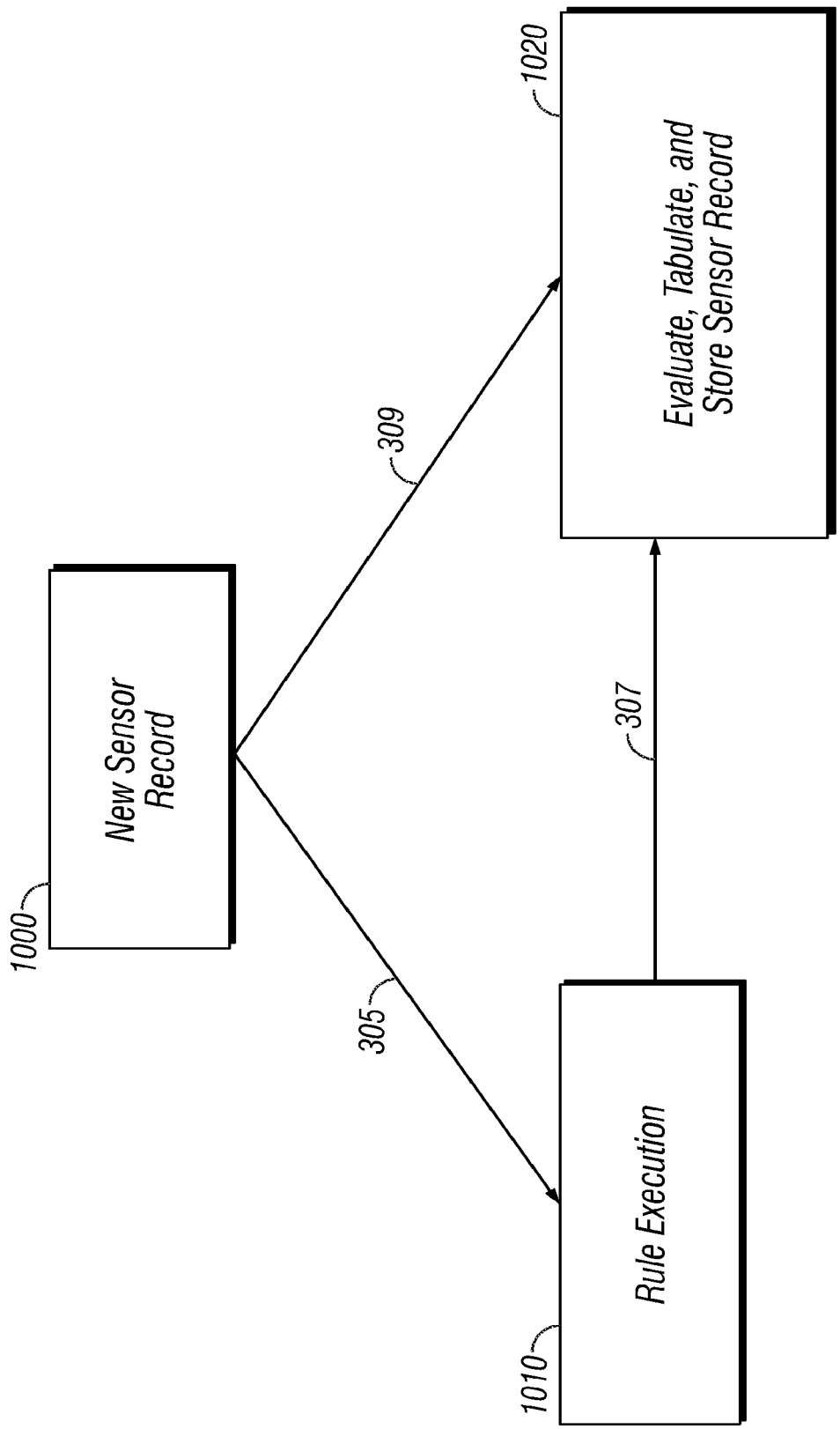
FIG. 2B is a flow diagram of a process that can be implemented by a computer program associated with the apparatus shown in FIGS. 4-9.

FIG. 2B illustrates a process where a new sensor record 1000 from the plurality dependent or independent sensors 200 is delivered to both the dynamically updateable rules engine 210 and the data collection management module 220. This FIG. 2B is associated with the apparatus shown in FIGS. 4-9. After the sensor data processing apparatus has been initialized, each sensor (from the plurality of dependent or independent sensors 200), upon detecting an event, communicates the information about the event to generate a new sensor record 1000, identifying itself (e.g., unique sensor ID, make and model of sensor, device, and/or instrument, etc.), the event (e.g., a post on the social media application Twitter to particular handle, the entry of an automobile onto a specific segment of a highway, etc.), and other data (e.g., the content of the tweet, or the road conditions, weather conditions). Still referring to FIG. 2B, this communication of new sensor record 1000 goes to both 210 and 220, but it is important to appreciate that the route to 220 can be either A) directly to 220 along 309 or B) indirectly to 220 by first along 305 to 210 and then second along 307 from 210 to 220. An implementation of this process is shown in FIG. 2B.

Figure 2C:
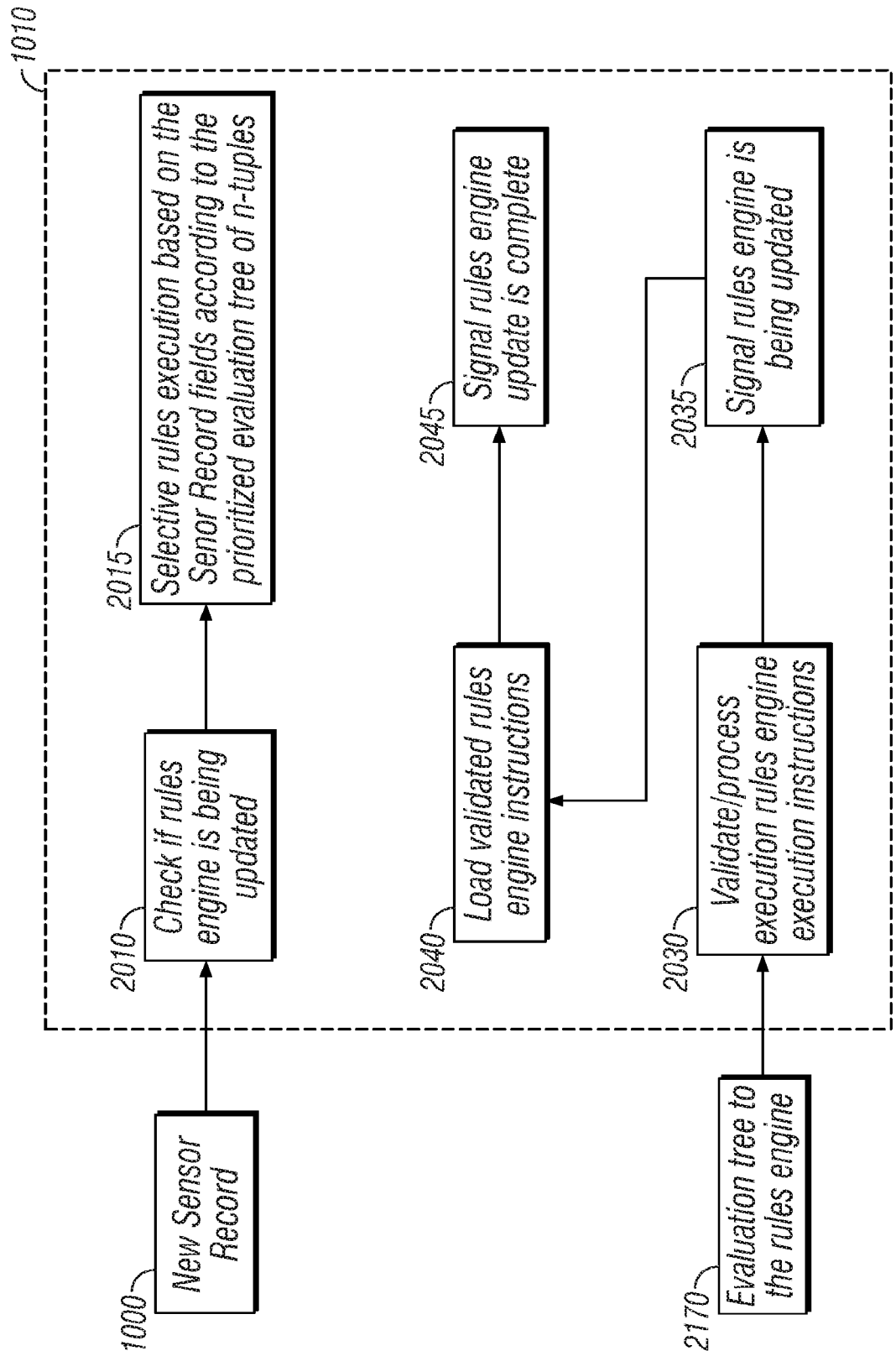
FIG. 2C is a flow diagram of a process that can be implemented by a computer program associated with the apparatus shown in FIGS. 4-9.

FIG. 2C illustrates a process 1010 whereby dynamically updateable rules engine 210 evaluates a new sensor record 1000 from a plurality of dependent or independent sensors 200. Additionally, FIG. 2C shows a process whereby dynamically updateable rules engine 210 handles updated rules for dynamically updateable rules engine 210. This FIG. 2C is associated with dynamically updateable rules engine 210 of the apparatus shown in FIGS. 4-9 and depicts a detailed process for the rule (evaluation and) execution process 1010 in FIG. 2B.

Upon receiving a new sensor record 1000, dynamically updateable rules engine 210 inspects the data fields of the sensor record and performs the tasks as defined by the rules. More specifically, the dynamically updateable rules engine 210 first determines if the rules (for dynamically updateable rules engine 210) are being updated 2010. If the dynamically updateable rules engine is being updated, it may wait until the update is complete before executing the defined tasks or note the update (including the date and time stamp) and then perform the tasks as dictated by the pre-updated rules. The dynamically updateable rules engine 210 will execute the rules based on the sensor record fields 2015 according to a prioritized evaluation tree 2170 (FIG. 2A). Moreover, upon receiving a new form of prioritized evaluation tree 2170, the dynamically updateable rules engine 210 validates/processes the prioritized evaluation tree 2030, signals the dynamically updateable rules engine is being updated 2035, and loads the validated form of prioritized evaluation tree 2040. This is followed by signaling that the rules engine update is complete. An implementation of this process is shown in FIG. 2C.

The prioritized evaluation tree 2170 may be passed to the dynamically updateable rules engine 210 as 1) a group of linked n-tuples from data collection management module 220, 2) as source for a computer program, 3) a compiled binary executable by a processor within dynamically updateable rules engine 210, and/or 4) as binary HDL. Case 1) the linked n-tuple is loaded into volatile or non-volatile memory for subsequent interpretation by the program running in dynamically updateable rules engine 210; or compiled into an executable binary and loaded into volatile or non-volatile memory and executed by processor in dynamically updateable rules engine 210; or compiled into binary HDL where it is loaded and executed directly as an FPGA within the dynamically updateable rules engine 210. Case 2) the source is compiled into an executable binary to be loaded into volatile or non-volatile memory executed by a processor in dynamically updateable rules engine 210; or compiled into binary HDL where it is loaded and executed as an FPGA within the dynamically updateable rules engine 210. Case 3) the compiled binary is loaded into volatile or non-volatile and executed by a processor in dynamically updateable rules engine 210. Case 4) the binary HDL is loaded and executed as an FPGA within the dynamically updateable rules engine 210. Cases 1)-4) occur as part of step 2030 in FIG. 2C.

The data collection management module 220 can further communicate via a bidirectional communication link and protocol 320 the sensor data to data storage and analysis inference component 230, where the raw information is stored and analyzed as shown in FIG. 1.

Figure 2D:
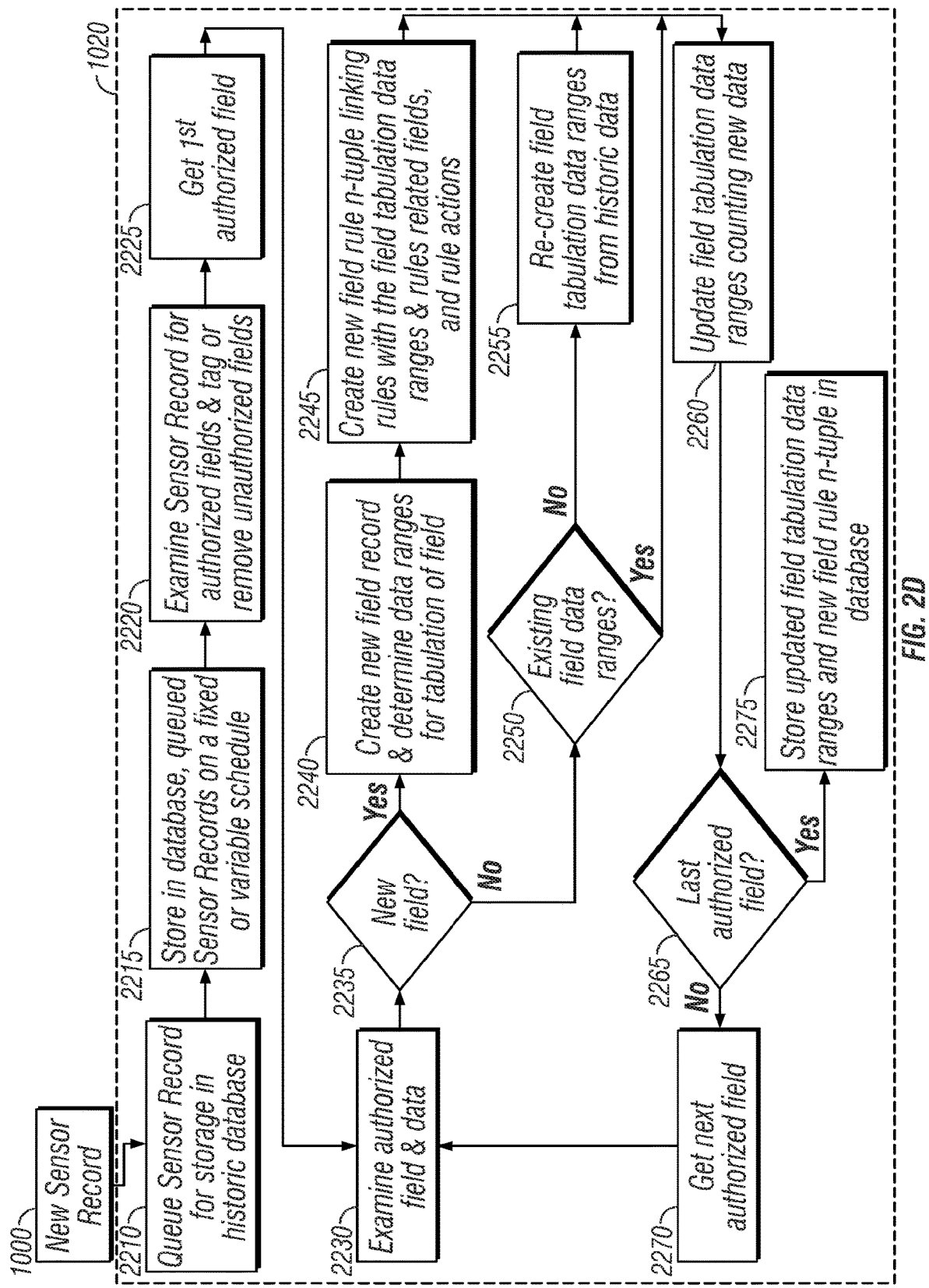
FIG. 2D is a flow diagram of a process that can be implemented by a computer program associated with the apparatus shown in FIGS. 4-9.

FIG. 2D illustrates a process 1020 whereby data collection management module 220 evaluates a new sensor record 1000 from a plurality of dependent or independent sensors 200. This FIG. 2D is associated with data collection management module 220 of the apparatus shown in FIGS. 4-9 and depicts a detailed process for the evaluate, tabulate and store sensor record process 1020 in FIG. 2B.

Upon receiving a new sensor record 1000, data storage and analysis inference component 230 queues the new sensor record for storage in a historical database 2210. Storage of the queued records may be performed on a fixed or variable schedule 2215. The variable schedule may be determined automatically by the rate of record arrival and the speed of writing to storage with the goal of preserving sufficient memory to queue the records. The fixed schedule may be configured through a user interface where system administrators specify the schedule. After the new sensor record 1000 is queued for storage, the data within the record are examined. Only fields which have been authorized are processed 2220. The authorized fields may be configured through a user interface where system administrators specify the authorized fields. For each authorized field, first determine if the field is new. (A field is new when it is newly authorized by a system administrator.) If the field is new, a new field record is created including the data ranges of the field based on historical data or configured through a user interface where system administrators specify the data ranges 2240. Moreover, the new field record includes a count of the times a data range has been encountered and may also include a weight associated with the data range. (The data range weight may be configured through the user interface or automatically through an inference engine process within data storage and analysis inference component 230.) Following the creation of the new field record, a new field n-tuple is created that links the new field with the rules and rules actions that are associated with the new field and other fields which are evaluated with the rules 2245. If the field exists, the value of the field is compared with the associated field record to determine if the field is within the existing range 2250. If the field is out of the existing range, a new field range is created including the new data and historical data 2255. The new field range record count is updated 2260. This is followed by step 2265 and step 2270. After the final field of the New Sensor Record 1000 is processed, the field record and the associated field n-tuple are stored in a database 2275 located within data storage and analysis inference component 230. An example of this process is shown in FIG. 2D.

Data storage and analysis inference component 230 may communicate with the external intelligent system 195, which can include computers on a private local area network, public or private cloud service and/or the Internet. Given access to the collected sensor data and rules, the external intelligent system 195 may provide additional data and insights on the stream of sensor data. New rules may be automatically generated by data storage and analysis inference component 230 (for dynamically updateable rules engine 210) that include insights from the external intelligent system 195. Furthermore, new rules may be automatically generated by the external intelligent system 195 alone and communicated to data storage and analysis inference component 230. These processes can be a part of the external intelligent system 195 identified in the various examples disclosed in FIGS. 4-9.

FIG. 3 is a diagram of hardware components associated with the dynamically updateable rules engine 210 in FIGS. 4-9. A sensor controller 3000 is coupled to a bus 3030. Rules engine logic circuit 3010 is coupled to the bus 3030. The rules engine logic circuit 3010 can include a field programmable gate array. The rules engine logic circuit can include a hardware description language (HDL) prioritized evaluation tree. A communication interface 3020 is coupled to the bus 3030. A processor 3040 is coupled to the bus 3030. A memory 3050 is coupled to the bus 3030. The memory 3050 can include a compiled binary prioritized evaluation tree. A storage controller 3060 is coupled to the bus 3030. A storage device 3070 is coupled to the storage controller 3060. Dynamically updateable rules engine 210 is not limited to the example shown in this FIG. 3 and is open to other hardware components, fewer hardware components and/or other coupling configurations of those components.

Figure 4:
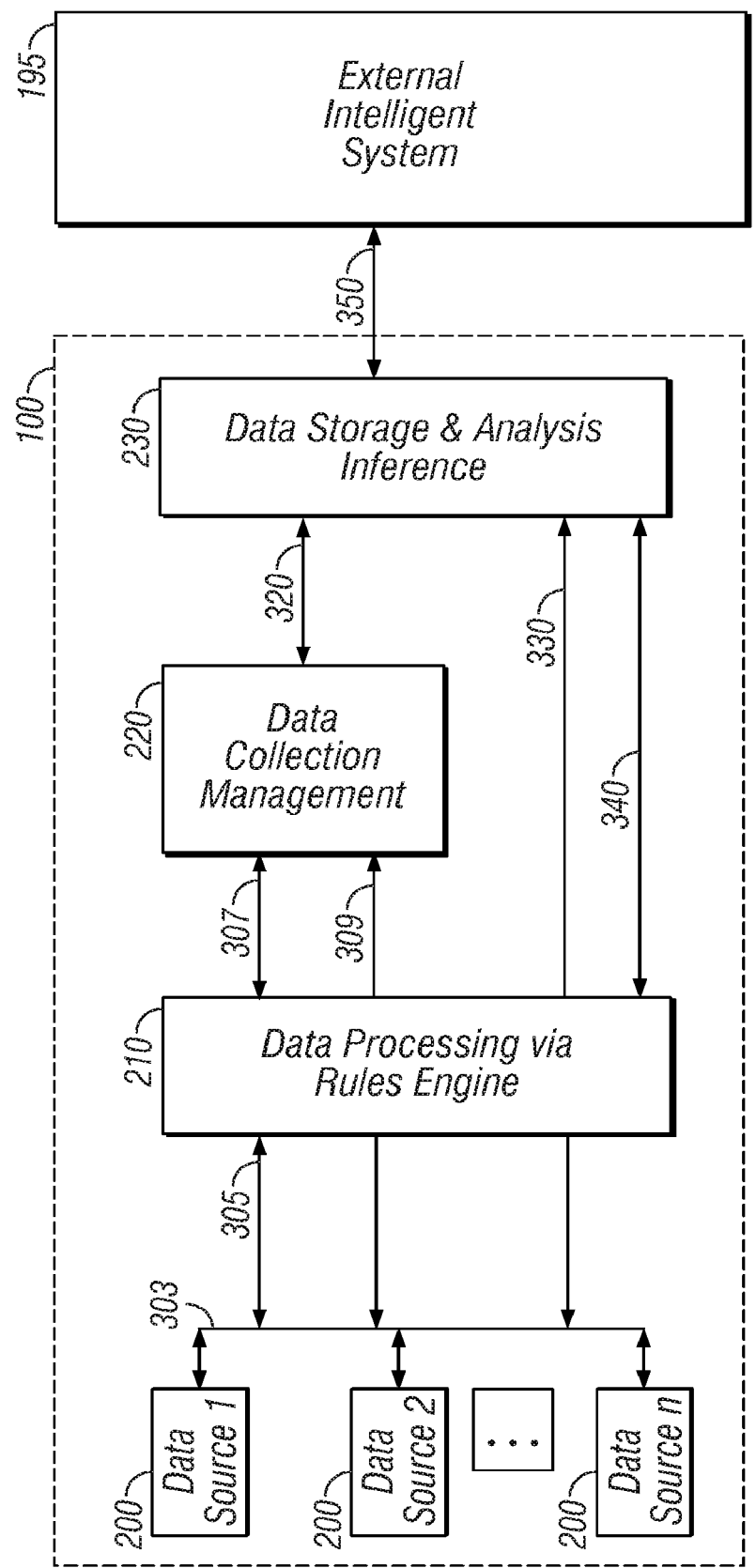
FIG. 4 is a block schematic diagram of a first example system.

FIG. 4 is a diagram of a first example system. A sensor rules processing management storage inference apparatus 100 is coupled to an external intelligent system 195. The sensor rules processing management storage inference apparatus 100 includes a plurality of data sources 1 to n including dependent or independent sensors 200, dynamically updateable rules engine 210, data collection management module 220 and a data storage and analysis inference component 230.

Still referring to the example of FIG. 4, the sensor rules processing management storage inference apparatus 100 includes 1) a plurality of dependent or independent sensors 200, 2) a dynamically updateable rules engine 210 for processing data collected by the sensors, 3) a data collection management module 220, and 4) a data storage and analysis inference component 230 that a) stores and analyses the data being collected by the sensors according to the rules as evaluated by the dynamically updateable rules engine, b) communicates reflexively to an individual, the system manager, informing current status and/or prompting for manual actions including new rules and/or rule evaluation sequences of existing rules for the dynamic update of the rules engine and the data model and c) infers new actions including new rules and/or new rule evaluation sequences of existing rules such that the new rules or rule sequences may be downloaded and dynamically update the rules engine.

Referring to FIGS. 4-9, an optional, separate external intelligent system 195 that may provide stored or derived data can be connected to the sensor apparatus via a high speed network where the external intelligent system 195 may provide data including but not limited to within parameter bounds, sampling rates and/or stability criterion which may be utilized by the data storage and analysis inference component 230. The dependent or independent sensors may be virtual sensors and/or real sensors.

Referring again to FIG. 4, the elements including data sources 1 to n including a plurality of dependent or independent sensors 200, dynamically updateable rules engine 210, data collection management module 220, and data storage and analysis inference component 230 are included in a single system sensor rules processing management storage inference apparatus 100. External intelligent system 195 is external to sensor rules processing management storage inference apparatus 100 and communication between the two is made via a bidirectional communication link and protocol 350. For efficiency, the bidirectional communication link and protocol 350 may be over a high speed wire including coaxial cable, multi wire such as Ethernet or fiber optics. The bidirectional communication link and protocol 350 can be wireless including 802.11 (WiFi). 802.15 (5G), or other high speed protocols.

The bidirectional communication link and protocol 350 can be made using protocols such as TCP/IP, UDP, etc. Access to functions between sensor rules processing management storage inference apparatus 100 and the external intelligent system 195 will be made in the most efficient manner including Application Programming Interface (API) calls or Web Services and Representation State Transfer (REST) interfaces accessible on the Internet enable access to the External Services and Data by Web applications also located on the Internet. Access to such Web Services can require authorization and authentication.

Figure 5:
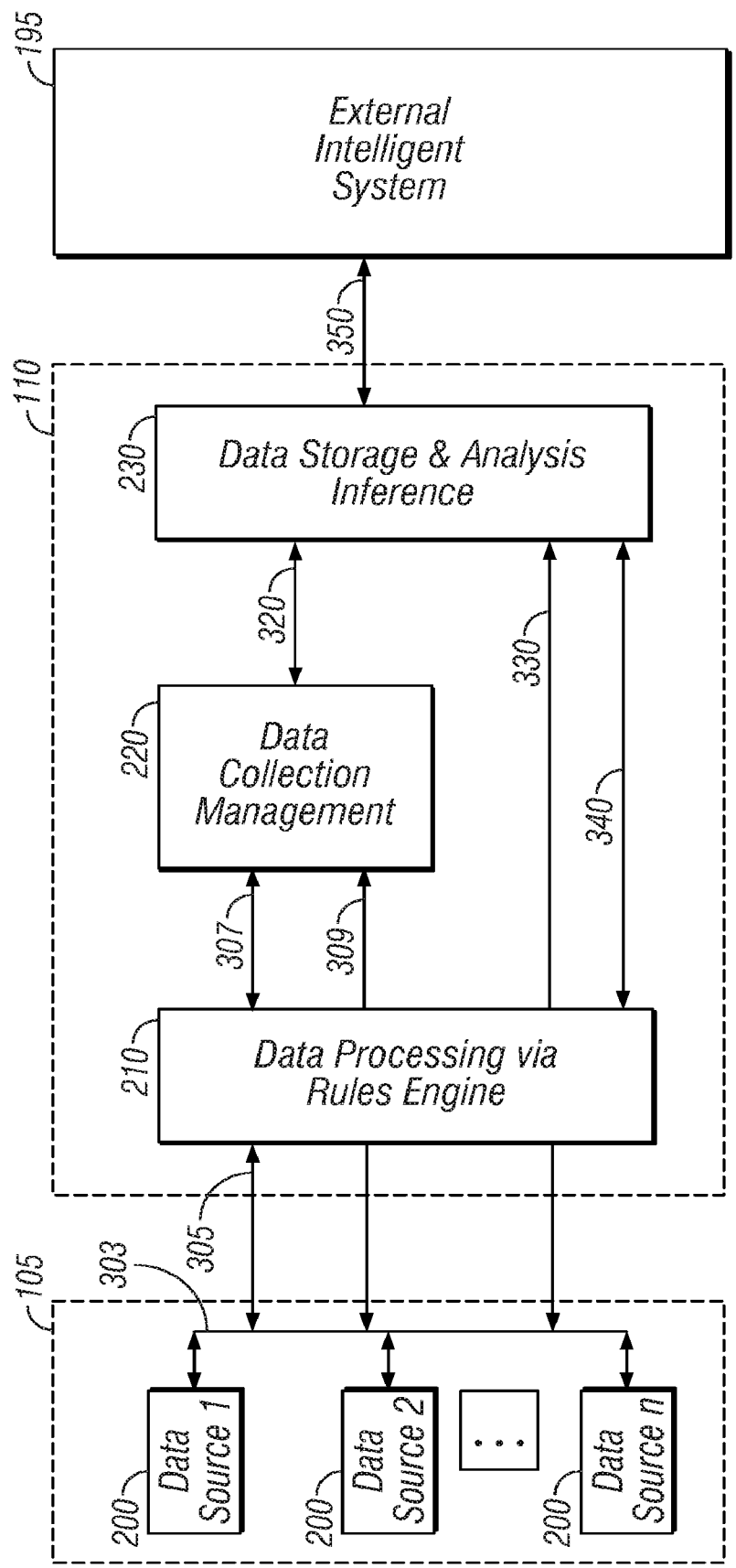
FIG. 5 is a block schematic diagram of a second example system.

FIG. 5 is a diagram of a second example system. A sensor apparatus 105, a rules processing management storage inference apparatus 110 and an external intelligent system 195 are all coupled together. The sensor apparatus 105 includes a plurality of dependent or independent sensors 200. The rules processing management storage inference apparatus 110 includes dynamically updateable rules engine 210, data collection management module 220 and data storage and analysis inference component 230.

Still referring to the second example of FIG. 5, the sensor apparatus 105 includes a plurality of dependent or independent sensors 200 connected via a communication network to separate rules processing management storage inference apparatus 110. The rules processing management storage inference apparatus 110 is made up of 1) a dynamically updateable rules engine 210 processing data collected by the sensors, 2) a data collection management module 220 and 3) a data storage and analysis inference component 230 that a) stores and analyses the data being collected by the sensors 200 according to the rules evaluated by the dynamically updateable rules engine 210, b) communicates reflexively to an individual, the system manager, informing current status and/or prompting for manual actions including new rules and/or rule evaluation sequences of existing rules for the dynamic update of the rules engine 210, and/or c) infers new actions including new rules and/or new rule evaluation sequences of existing rules such that the new rules or rule sequences may be downloaded and dynamically update the rules engine 210.

In the second example illustrated in FIG. 5, elements such as dynamically updateable rules engine 210, data collection management module 220, and data storage and analysis inference component 230 are included in a single system rules processing management storage inference apparatus 110. The data sources 1 to n including a plurality of dependent or independent sensors are part of the independent sensor apparatus 105 communicating to rules processing management storage inference apparatus 110 through a bidirectional communication link and protocol 305, 309, 330. The external intelligent system 195 is external to rules processing management storage inference apparatus 110 and communicates through bidirectional communication link and protocol 350 in the manner described in FIG. 4.

Bidirectional communication links 305, 309, 330 may be over a high speed wire including coaxial cable, multi wire such as Ethernet or fiber optics. The communication links 305,309, 330 can be wireless including 802.11 (WiFi), 802.15 (5G), or other high speed protocols.

The bidirectional communication protocol of links 305, 309, 330 can be made in the most efficient manner including Message Queuing Telemetry Transport (MQTT), Advanced Message Queuing Protocol (AMQP), Streaming Text Oriented Messaging Protocol (STOMP), the IETF Constrained Application Protocol, Extensible Messaging and Presence Protocol (XMPP), Data Distribution Services (DDS), OPC Unified Architecture (UA), and Web Application Messaging Protocol (WAMP).

Figure 6:
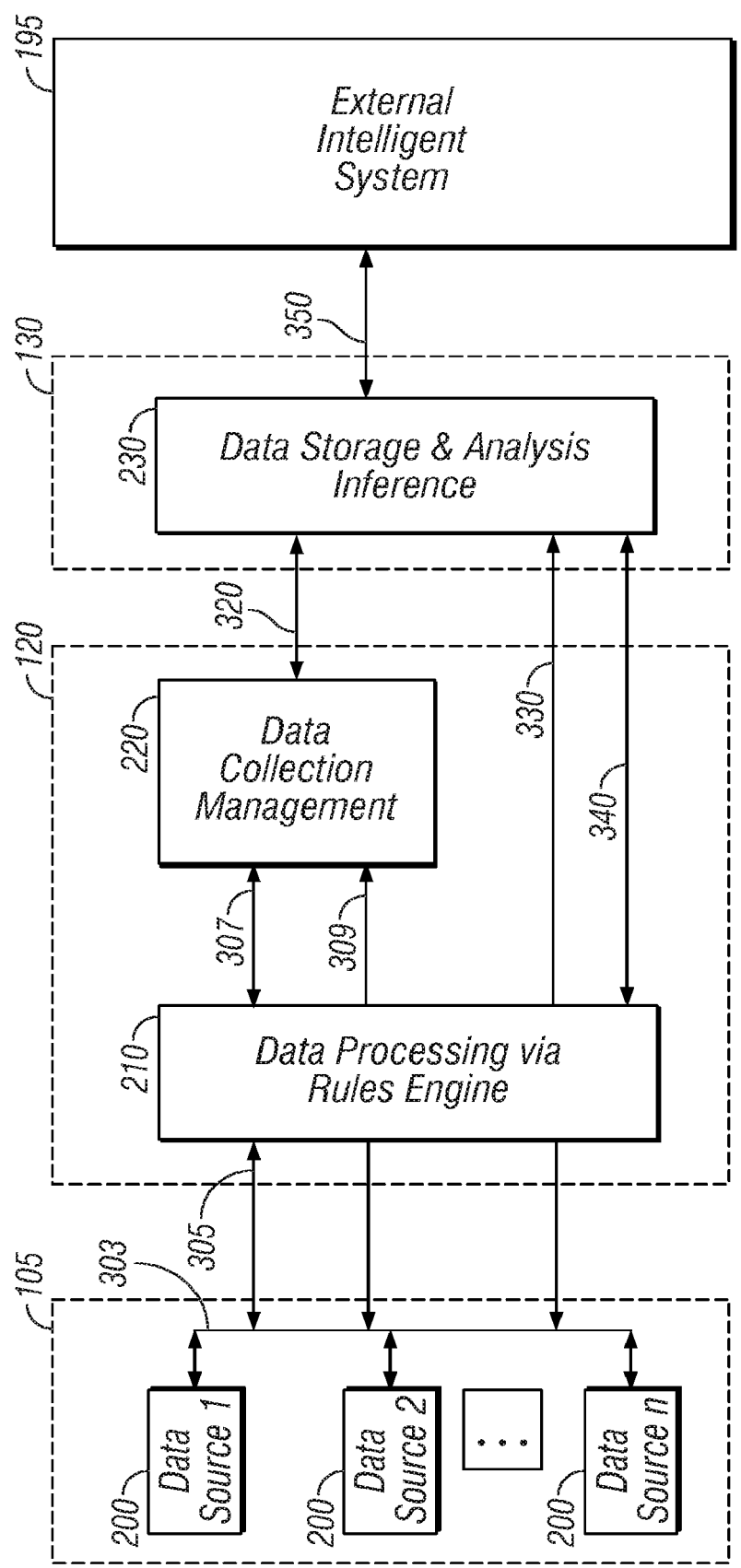
FIG. 6 is a block schematic diagram of a third example system.

FIG. 6 is a diagram of a third example system. A sensor apparatus 105, rules processing management apparatus 120, storage inference apparatus 130 and an external intelligent system 195 are all coupled together. The sensor apparatus 105 includes a plurality dependent or independent sensors 200. The rules processing management apparatus 120 includes the dynamically updateable rules engine 210 and a data collection management module 220. The storage inference apparatus 130 contains a data storage and analysis inference component 230.

Still referring to the example of FIG. 6, the sensor apparatus 105 includes a plurality of dependent or independent sensors 200 connected via a communication network to separate rules processing management apparatus 120. The rules processing management apparatus 120 is made up of 1) a dynamically updateable rules engine 210 processing data collected by the sensors and 2) a data collection management module 220 connected via a high speed communication network to a storage inference apparatus 130. The storage inference apparatus 130 is made up of a data storage and analysis inference component 230 that 1) stores and analyses the data being collected by the sensors 200 according to the rules as evaluated by the dynamically updateable rules engine 210, 2) communicates reflexively to an individual, the system manager, informing current status and/or prompting for manual actions including new rules and/or rule evaluation sequences of existing rules for the dynamic update of the rules engine 210, and/or 3) infers new actions including new rules and/or new rule evaluation sequences of existing rules such that the new rules or rule sequences may be down loaded and dynamically update the rules engine 210.

In the third example illustrated in FIG. 6, elements such as dynamically updateable rules engine 210 and data collection management module 220 are included in rules processing management apparatus 120. Data storage and analysis inference component 230 is included in a separate storage inference apparatus 130. Data sources 1 to n including a plurality of dependent or independent sensors 200 are part of an independent sensor apparatus 105 communicating to storage inference apparatus 120 through a bidirectional communication link and protocol 305 in the manner described for FIG. 5. External intelligent system 195 is external to rules processing management apparatus 120 and storage inference apparatus 130 and communicates in the manner described above for FIG. 4.

Bidirectional communication links 320, 330, and 340 may be over a high speed wire including coaxial cable, multi wire such as Ethernet or fiber optics. The communication links 320, 330 and 340 can be wireless including 802.11 (WiFi), 802.15 (5G), or other high speed link protocols.

The bidirectional communication protocol 320, 330, and 340 will be made using protocols such as TCP/IP, UDP, etc. Access to functions between Rules Processing Apparatus 140 and Manage Storage Inference Apparatus 150 will be made in the most efficient manner including Application Programming Interface (API) calls or Web Services and Representation State Transfer (REST) interfaces accessible on the Internet enable access to the External Services and Data by Web applications also located on the Internet. Access to such Web Services can require authorization and authentication.

Figure 7:
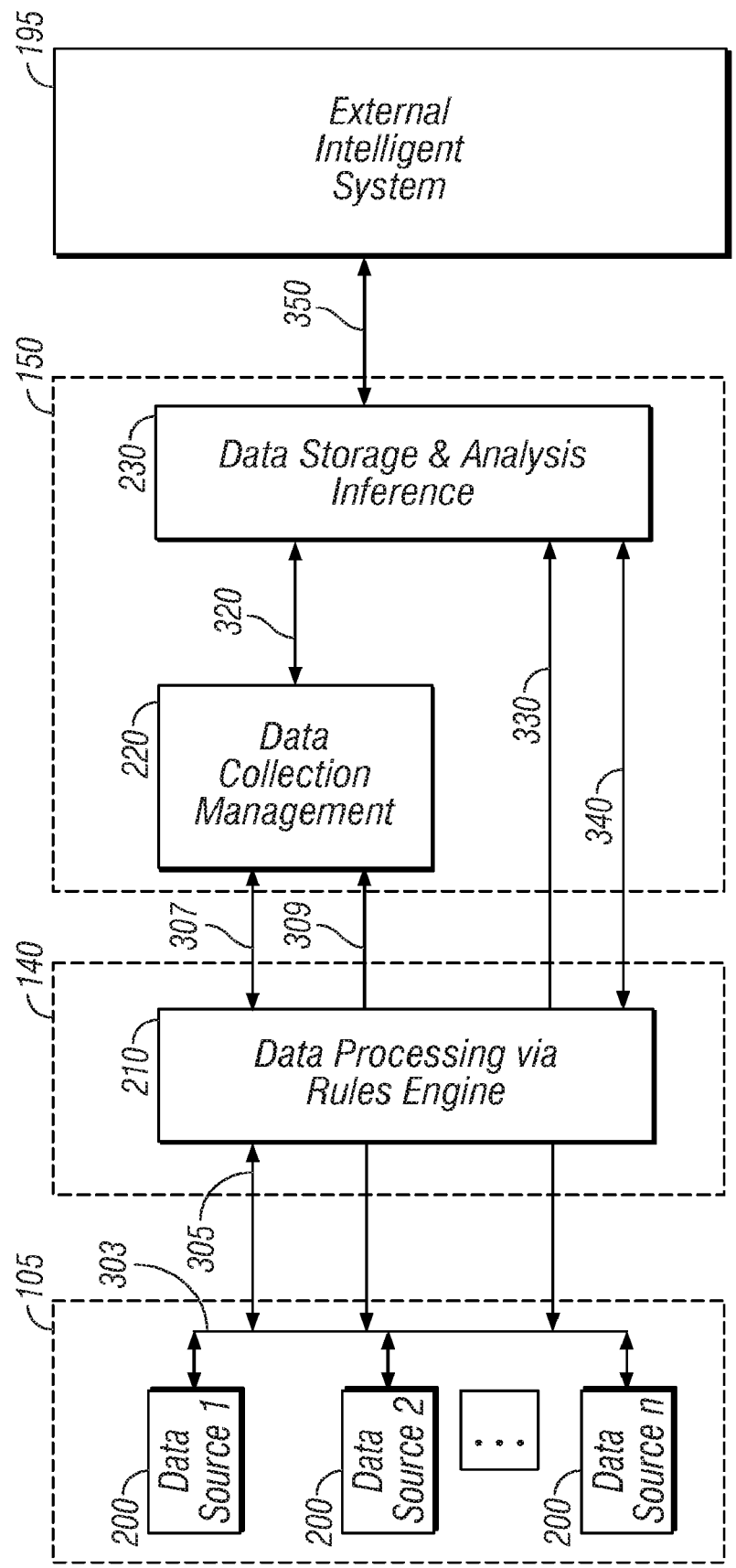
FIG. 7 is a block schematic diagram of a fourth example system.

FIG. 7 is a diagram of a fourth example system. A sensor apparatus 105, rules processing apparatus 140, manage storage inference apparatus 150 and an external intelligent system 195 are all coupled together. The sensor apparatus 105 includes a plurality of dependent or independent sensors 200. The rules processing apparatus 140 includes a dynamically updateable rules engine 210. The manage storage inference apparatus 150 includes a data collection management module 220 and a data storage and analysis inference component 230.

Still referring to the fourth example of FIG. 7, the sensor apparatus 105 includes a plurality of dependent or independent sensors 200 connected via a communication network to a separate rules processing apparatus 140. The rules processing apparatus is made up of a dynamically updateable rules engine 210 processing data collected by the sensors connected via a high speed communication network to a management storage inference apparatus 150. The management storage inference apparatus 150 is made up of 1) a data collection management module 220 and 2) a data storage and analysis inference component 230 that a) stores and analyses the data being collected according to the rules as evaluated by the dynamically updateable rules engine 210, b) communicates reflexively to an individual, the system manager, informing current status and/or prompting for manual actions including new rules and/or rule evaluation sequences of existing rules for the dynamic update of the rules engine 210, and/or c) infers new actions including new rules and/or new rule evaluation sequences of existing rules such that the new rules or rule sequences may be downloaded and dynamically update the rules engine 210.

In the fourth example illustrated in FIG. 7, the elements such as data collection management module 220 and data storage and analysis inference component 230 are included in manage storage inference apparatus 150. Dynamically updateable rules engine 210 is included in a separate rules processing apparatus 140. Data sources I to n include a plurality of dependent or independent sensors 200 are part of independent sensor apparatus 105 communicating to rules processing apparatus 140 through a bidirectional communication link and protocol 305 in the manner described for FIG. 5. External intelligent system 195 is external to manage storage inference apparatus 150 and communicates in the manner described above for FIG. 4. Dynamically updateable rules engine 210 communicates with manage storage inference apparatus 150 through bidirectional communication links 307 and 340.

Bidirectional communication links 307 and 340 may be over a high speed wire including coaxial cable, multi wire such as Ethernet or fiber optics. The communication links 307 and 340 can be wireless including 802.11 (WiFi), 802.15 (5G). or other high speed link protocols.

The bidirectional communication protocol for links 307 and 340 can be made using protocols such as TCP/IP, UDP, etc. Access to functions between rules processing apparatus 140 and manage storage inference apparatus 150 will be made in the most efficient manner including Application Programming Interface (API) calls or Web Services and Representation State Transfer (REST) interfaces accessible on the Internet enable access to the External Services and Data by Web applications also located on the Internet. Access to such Web Services may require authorization and authentication.

Figure 8:
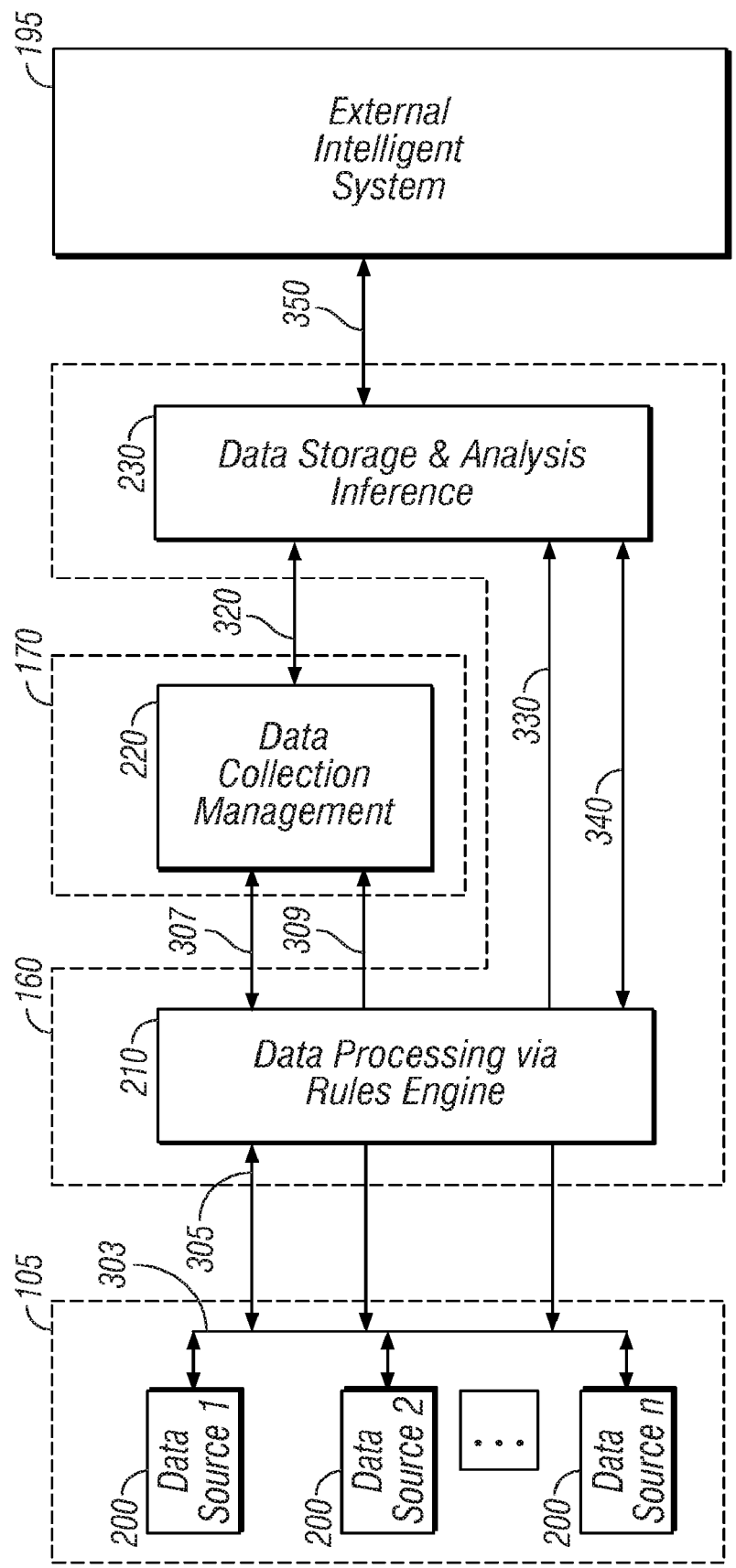
FIG. 8 is a block schematic diagram of a fifth example system.

FIG. 8 is a diagram of a fifth example system. A sensor apparatus 105, rules processing storage inference apparatus 160, management apparatus 170 and an external intelligent system 195 are all coupled together. The sensor apparatus 105 includes a plurality of dependent or independent sensors 200. The rules processing storage inference apparatus 160 includes a dynamically updateable rules engine 210 and a data storage and analysis inference component 230. The management apparatus 170 includes a data collection management module 220.

Still referring to the example of FIG. 8, the sensor apparatus 105 includes a plurality of dependent or independent sensors 200 connected via a high speed communication network to a separate rules processing storage inference apparatus 160. The rules processing storage inference apparatus 160 is made up of 1) a dynamically updateable rules engine 210 processing data collected by the sensors 200 and 2) a data storage and analysis inference component 230 that a) stores and analyses the data being collected by the sensors according to the rules as evaluated by the dynamically updateable rules engine 210, b) communicates reflexively to an individual, the system manager, informing current status and/or prompting for manual actions including new rules and/or rule evaluation sequences of existing rules for the dynamic update of the rules engine, and/or c) infers new actions including new rules and/or new rule evaluation sequences of existing rules such that the new rules or rule sequences may be downloaded and dynamically update the rules engine 210 connected via a communication network to a management apparatus 170. The management apparatus is made up of a data collection management module 220 connected via a communication network and protocol to the dynamically updateable rules engine 210 and the data storage and analysis inference component 230.

In the fifth example illustrated in FIG. 8, elements such as dynamically updateable rules engine 210 and Data storage and analysis inference component 230 are included in rules processing storage inference apparatus 160. Data collection management module 220 is included in a separate management apparatus 170. Again, data sources 1 to n include a plurality of dependent and independent sensors 200 that are part of independent sensor apparatus 105 communicating to rules processing storage inference apparatus 160 through a bidirectional communication link and protocol 305 in the manner described for FIG. 5. External intelligent system 195 is external to rules processing storage inference apparatus 160 and communicates 350 in the manner described above for FIG. 4. Management apparatus 170 communicates with rules processing storage inference apparatus 160 through bidirectional communication links 307 and 320.

Bidirectional communication links 307 and 320 may be over a high speed wire including coaxial cable, multi wire such as Ethernet or fiber optics. Communication links 307 and 320 could be wireless including 802.11 (WiFi), 802.15 (5G), or other high speed link protocols.

The bidirectional communication protocol 307 and 320 can be made using protocols such as TCP/IP, UDP, etc. Access to functions between Rules Processing Storage Inference Apparatus 160 and Management Apparatus 170 will be made in the most efficient manner including Application Programming Interface (API) calls or Web Services and Representation State Transfer (REST) interfaces accessible on the Internet enable access to the External Services and Data by Web applications also located on the Internet. Access to such Web Services can require both authorization and authentication.

Figure 9:
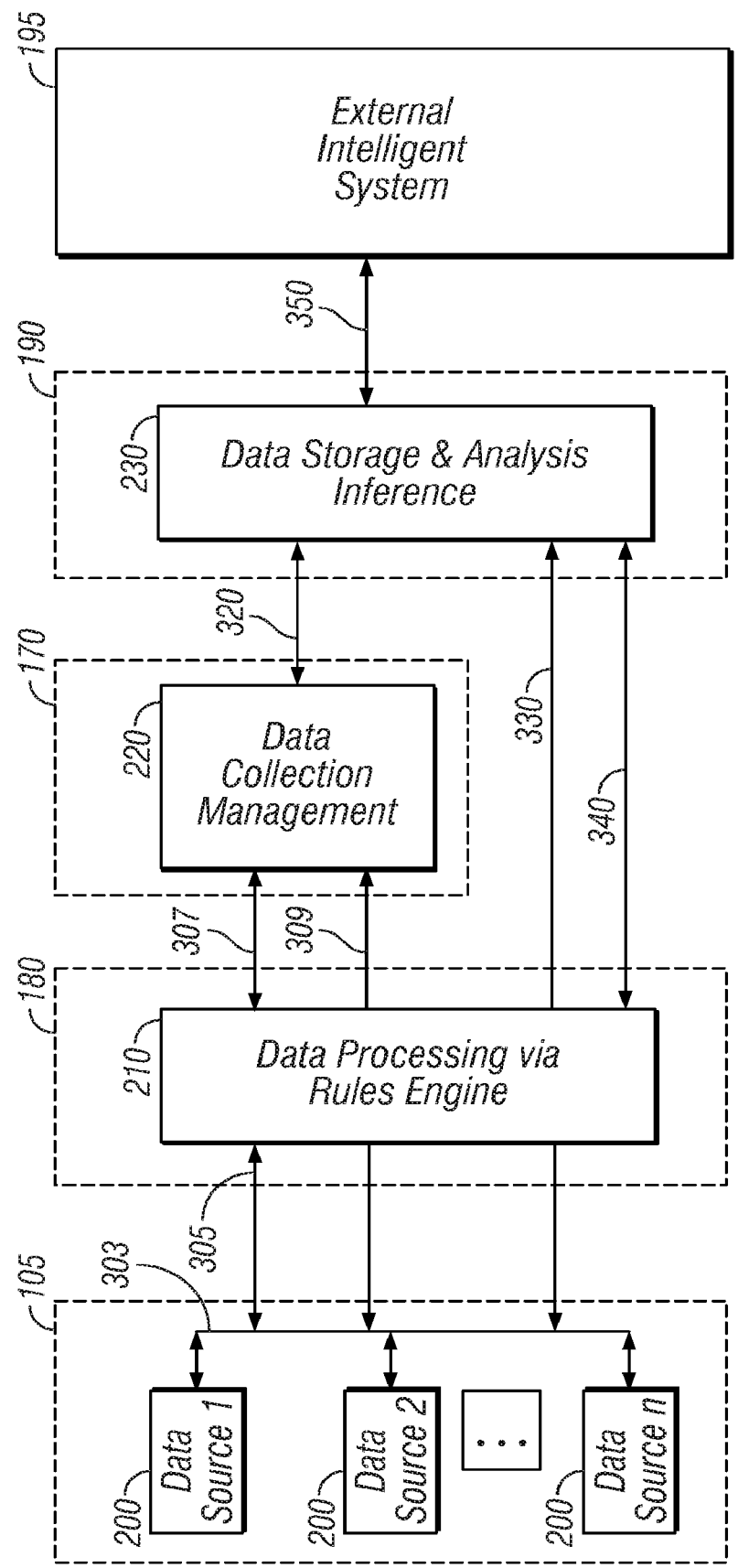
FIG. 9 is a block schematic diagram of a sixth example system.

FIG. 9 is a diagram of a sixth example system. A sensor apparatus 105, a rules processing apparatus 180, a management apparatus 170, a storage inference apparatus 190 and an external intelligent system 195 are all coupled together. The sensor apparatus 105 includes a plurality of dependent or independent sensors 200. The rules processing apparatus 180 includes a dynamically updateable rules engine 210. The management apparatus 170 contains a data collection management module 220. The storage inference apparatus includes a data storage and analysis inference component 230.

Still referring to the example of FIG. 9, the sensor apparatus 105 includes a plurality of dependent or independent sensors 200 connected via a high speed communication network to separate rules processing apparatus 180. The rules processing apparatus 180 is made up of a dynamically updateable rules engine 210 processing data collected by the sensors 200 connected via a communication network to a management apparatus 170. The management apparatus 170 is made up of a data collection management module 220 connected via a communication network to a separate storage inference apparatus 190. The storage inference apparatus 190 is made up of a data storage and analysis inference component 230 that 1) stores and analyses the data being collected by the sensors according to the rules as evaluated by the dynamically updateable rules engine, 2) communicates reflexively to an individual, the system manager, informing current status and/or prompting for manual actions including new rules and/or rule evaluation sequences of existing rules for the dynamic update of the rules engine, and/or 3) infers new actions including new rules and/or new rule evaluation sequences of existing rules such that the new rules or rule sequences may be downloaded and dynamically update the rules engine.

In the sixth example illustrated in FIG. 9, dynamically updateable rules engine 210 is included in separate rules processing apparatus 180. Data collection management module 220 is included in a separate management apparatus 170. Data storage and analysis inference component 230 is included in a separate storage inference apparatus 190. Data sources 1 to n, including a plurality of dependent and independent sensors 200, are part of independent sensor apparatus 105 communicating to rules processing apparatus 180 through a bidirectional communication link and protocol 305 in the manner described for FIG. 5. External intelligent system 195 is external to storage inference apparatus 190 and communicates 350 in the manner described above for FIG. 4. Rules processing apparatus 180 communicates with management apparatus 170 through bidirectional communication link 307 and with storage inference apparatus 190 through bidirectional link 340. Management apparatus 170 communicates to storage inference apparatus 190 through bidirectional link 320.

Bidirectional links 330 and 340 communicate in the manner described in FIG. 6. Bidirectional links 307 and 320 communicate in the manner described in FIG. 8.

A practical application of an example of the present disclosure that has value Within the technological arts is for controlling a system that is subject to varying operating conditions. Further, an example of the present disclosure is useful in conjunction with operating a server farm that is experiencing fluctuating loads, or in conjunction with operating a large truck that is crossing a mountain range. Many other uses may be made of the examples of the present disclosure; not all these uses need to be detailed herein.

The above examples are only illustrative of the principles disclosed herein and are not intended to be limiting. One skilled in the art will recognize that services described may be deployed using one or more servers, on user devices, and in combination with other system components. In particular, it is contemplated that functional implementation of the systems, apparatuses, and networks described herein may be implemented equivalently in hardware, software, firmware, and/or other available functional components or building blocks. Accordingly, various modifications, adaptations, and combinations of various features of the described examples can be practiced without departing from the scope of the appended claims.

The appended claims are not to be interpreted as including means-plus-function limitations, unless such a limitation is explicitly recited in a given claim using the phrase(s) "means for" or "mechanism for" or "step for". Sub-generic examples of this disclosure are delineated by the appended independent claims and their equivalents. Specific examples of this disclosure are differentiated by the appended dependent claims and their equivalents.

We claim:

1. A system for automatic and dynamic control of machine operations, comprising:
 a connection to a machine external to the system;
 one or more sensors configured and deployed to monitor an operation of the external machine and to generate sensor records;
 a sensor data processing apparatus configured and deployed to receive one or more sensor records from the one or more sensors, and to identify, based on the received one or more sensor records, one or more events and corresponding event conditions affecting an operation of the machine;
 the sensor data processing apparatus further configured to identify a rule set comprising a plurality of rules that when applied to the machine, alter the operation of the machine;
 the sensor data processing apparatus selectively prioritizing application of one or more rules from the rule set, comprising:
  selecting for application to the machine, only those rules that are operationally relevant to identified events and corresponding conditions affecting the operation of the machine, and
  discarding from application to the machine, all rules that apply only to events and corresponding conditions other than those affecting the operation of the machine, and
 a processor exercising bi-directional control of the external machine through one of a dedicated network and a public network.

2. The system of claim 1, comprising:
 the sensor data processing apparatus further configured to identify a need to dynamically update the rule set used to alter the operation of the machine;
 the sensor data processing apparatus dynamically updating the rule set based on an identified need; and
 the sensor data processing apparatus selectively prioritizing application of one or more rules from the updated rule set.

3. The system of claim 2, wherein to update the rule sets, the sensor data processing apparatus:
 examines a sensor record to identify potential rules data within the sensor record,
 identifies authorized fields within the sensor record, and within each authorized field, set data ranges, creates a field n-tuple linking the field with the rules and rules actions that are associated with the field as well as other fields.

4. The system of claim 3, comprising with each authorized field, data ranges are set manually when no historical sensor record data are available and are set automatically when historical data associated with the field is available or if there default range values specified for the field, wherein the other fields define one or more of evaluation priorities, weights, and functions to be utilized when encountering a specific authorized field, wherein rules that set unauthorized fields or have no associated actions are flagged as such and removed.

5. The system of claim 1, comprising bi-directional control to receive the sensor records and to provide control signals to the one or more sensors to alter operations of one or more of the sensors.

6. The system of claim 5, wherein altering operations of a sensor comprises the sensor data processing apparatus providing control signals to the sensor comprising sensor initialization, sensor sampling rate, and criteria for generating a new sensor record.

7. The system of claim 1, wherein the rule sets are assembled as a prioritized evaluation tree structure organized and optimized for a specific event.

8. The system of claim 1, wherein the rule sets are assembled as a prioritized evaluation tree structure organized and optimized for a plurality of events.

9. The system of claim 1, wherein one or more rule sets is assigned a complexity value, wherein the rule sets are evaluated and organized, wherein the sensor data processing apparatus associates a sensor rule set with other sensor rule sets of a same complexity, wherein the complexity for a sensor rule set is equal to a number of other rule sets related to the sensor, wherein the complexity value also includes an historical tabulation of sensor data ranges, and wherein rule sets with the same complexity are grouped together.

10. The system of claim 9, comprising ordering groupings into a prioritized evaluation tree from a least complex groupings to a most complex groupings.

11. The system of claim 1, comprising upon receiving a new sensor record, the sensor data processing apparatus:
  queues the new sensor record for storage in a historical database;
  examines data in the new sensor record to identify authorized fields;
  processes the authorized fields;
  for each authorized field, determines that the field is new; and
  creates a new field record including data ranges of the field based on one or more of historical data and configured through a user interface, wherein the new field record includes a count of times a data range has been encountered.

12. The system of claim 11, wherein, following creation of the new field record, a new field n-tuple is created that links the new field with the rules and rules actions that are associated with the new field and other fields which are evaluated with the rules, wherein for an existing filed a value of the field is compared with the associated field record to determine the field is within an existing range, wherein for a field that is out of the existing range, a new field range is created including the new data and historical data.

13. The system of claim 12, comprising a data store for storing queued sensor records on one of a fixed and a variable schedule, wherein the variable schedule is determined automatically by a rate of arrival of the sensor records and a speed of writing the queued sensor records to the data store.

14. A computer-implemented method for controlling an external machine, comprising:
  establishing, from a data processing apparatus external to the external machine, a connection to the external machine, the data processing apparatus exercising bi-directional control of the external machine through the connection, the connection comprising one of a dedicated network and a public network;
  the data processing apparatus configuring one or more sensors deployed to monitor operations of the external machine to generate sensor records;
  the data processing apparatus configured to receive one or more sensor records from the one or more sensors, and to identify, based on the received one or more sensor records, one or more events and corresponding event conditions affecting an operation of the external machine;
  identifying, by the data processing apparatus, a rule set comprising a plurality of rules that when applied to the external machine, alter the operation of the external machine; and
  the data processing apparatus selectively prioritizing application of one or more rules from the rule set, comprising the data processing apparatus selecting for application to the external machine, only those rules that are operationally relevant to identified events and corresponding conditions affecting the operation of the external machine.

15. The method of claim 14, comprising discarding from application to the external machine, all rules that apply only to events and corresponding conditions other than those affecting the operation of the external machine.

16. The method of claim 14, comprising generating rules and prioritized rule sets for controlling operation of the external machine, wherein one or more rule sets is assigned a complexity value, wherein the rule sets are evaluated and organized, wherein the data processing apparatus associates a sensor rule set with other sensor rule sets of a same complexity, wherein the complexity for a sensor rule set is equal to a number of other rule sets related to the sensor, wherein the complexity value also includes an historical tabulation of sensor data ranges, and wherein rule sets with the same complexity are grouped together.

17. A non-transitory, computer-readable storage medium having encoded thereon, machine instructions executable by a processing apparatus for controlling operation of an external machine, wherein the processing apparatus executes the machine instructions to:
  establish a connection from a data processing apparatus to the external machine the processing apparatus exercising bi-directional control of the external machine through the connection, the connection comprising one of a dedicated network and a public network;
  configure one or more sensors deployed to monitor operations of the external machine to generate sensor records;
  receive one or more sensor records from the one or more sensors, and to identify, based on the received one or more sensor records, one or more events and corresponding event conditions affecting an operation of the external machine;
  identify a rule set comprising a plurality of rules that when applied to the external machine, alter the operation of the external machine; and
  selectively prioritize application of one or more rules from the rule set, wherein the data processing apparatus selects for application to the external machine, only those rules that are operationally relevant to identified events and corresponding conditions affecting the operation of the external machine.

18. The non-transitory, computer-readable storage medium of claim 17, wherein upon receiving a new sensor record, the processing apparatus:
  queues the new sensor record for storage in a historical database;
  examines data in the new sensor record to identify authorized fields;
  processes the authorized fields;
  for each authorized field, determines that the field is new; and
  creates a new field record including data ranges of the field based on one or more of historical data and configured through a user interface, wherein the new field record includes a count of a number of times a data range has been encountered.

\* \* \* \* \*